Oct. 27, 1953 N. S. PARKS 2,657,304
DUPLEX RADIO APPARATUS CONTROL
Filed Oct. 31, 1950
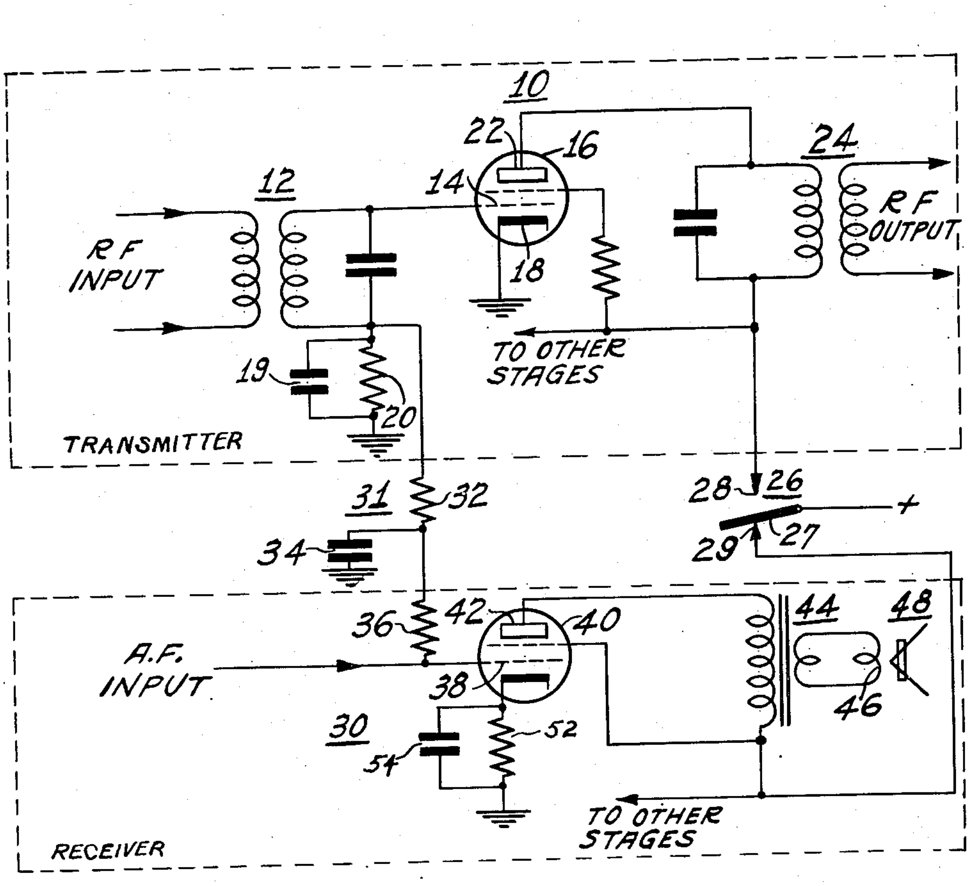
INVENTOR
Nathan S. Parks
BY
Charles H. Brown
ATTORNEY Patented Oct. 27, 1953 2,657,304

UNITED STATES PATENT OFFICE 2,657,304

DUPLEX RADIO APPARATUS CONTROL

Nathan Samuel Parks, Springfield, Pa., assignor to Radio Corporation of America, a corporation of Delaware Application October 31, 1950, Serial No. 193,137

9 Claims. (Cl. 250—13)

The invention relates to duplex radio transmission apparatus and it particularly pertains to circuitry for disabling receiving apparatus during operation of transmitting apparatus in a half-duplex radio communication system.

Half-duplex radio communication systems are widely used for establishing two-way communications between two or more points but where simultaneous communication in both directions is not required. Examples of such communications systems will be found in police and fire department radio systems, railroad intercommunications, air-line control networks, citizens' radio services and the like.

In these radio communication systems, it is customary to employ a receiver and a transmitter located substantially side by side; sometimes both components being built on the same chassis. Various means of supplying power to these equipments are possible. The most popular arrangement is of the type where a medium voltage anode supply is switched between the receiver and the lower power stages of the transmitter, the high power stages of the transmitter being automatically energized when the switching operation energizes the lower power stages of the transmitter. In such an arrangement, the receiver is blocked when the transmitter is energized. When the transmitter is de-energized and the receiver energized in reversing the direction of communication, annoying clicks, blurps, acoustical and radio frequency feedback from the transmitter to the receiver occur for a short period of time. Blooping effects are especially prevalent where the transmitter and receiver are tuned to the same frequency or to very closely related frequencies as is so often desired. Not only are these clicks and blurps exceedingly disconcerting in themselves, but further they are apt to cause misunderstanding or mutilation of the initial words of the text being transmitted by the distant station.

Various means have been suggested to correct this situation, but all of them are complicated in design, expensive to manufacture, require a relatively large number of components, and take up considerable volume of space in the equipment.

It is an object of the invention to provide a circuit arrangement for energizing and de-energizing co-operating radio receiver and transmitter apparatus without introducing interaction due to residual R. F. or A. F. field effects normally present in the apparatus.

It is another object of the invention to provide a circuit arrangement for energizing a receiver used in combination with a transmitter which is simultaneously de-energized without the introduction of annoying acoustical phenomena.

It is a further object of the invention to provide a circuit in accordance with the foregoing objects which is inexpensive, simple and compact.

It is still another object to provide a circuit arrangement in accordance with the foregoing objects which may be added to existing receiver and transmitter combination installations without undue complication and expense.

It is still a further object of the invention to provide a circuit arrangement in accordance with the foregoing objects which does not require critical adjustment.

Thes and other objects which will appear as the specification progresses are attained by deriving a direct potential in the transmitter portion of the arrangement and applying it to the audio frequency amplifying stages of the receiver in such a manner as to block the receiver during periods of operation of the transmitter. A simple delay or filter arrangement is interposed in the leads to cause the receiver actuation to be delayed a short period of time after the transmitter is disabled to prevent residual magnetic field effects from developing undesired voltages at the output of the receiver.

The invention is described in greater detail below with reference to the accompanying drawing forming part of the specification and in which the sole figure is a schematic diagram illustrating only those circuit components of a transmitter-receiver combination essential for an understanding of the invention.

Radio frequency energy of a transmitter obtained from frequency controlling and/or modulation stages (not shown) is applied to the input circuit of a radio frequency vacuum tube amplifier 10 by means of a transformer 12. The secondary of transformer 12 is connected to the grid element 14 and to the cathode element 18 of a vacuum tube amplifier 16 through the intermediary of a capacitor 19. Radio frequency output is obtained from the anode electrode 22 and is coupled to further ampliler stages (not shown) by way of a transformer 24. Anode and screen grid potentials are applied to amplifier 10 by means of a switch 26 having an arm 27, front contacts 28 and back contacts 29. Switch 26 is preferably in the form of a relay actuated in response to operation of the transmitting key or the press-to-talk switch on the microphone, although it may be a simple single-pole doublethrow toggle switch as shown, or any of a number of switches known to the art and capable of serving this purpose. Upon arm 27 being thrown to contact 28, the transmitter stages are energized, and self-bias for amplifier stage 10 is developed across a bias resistor 20 due to the fact that control grid 14 is operating in the positive region. A portion of the bias current is then applied, by way of a filter arrangement comprising a resistor 32 and a capacitor 34 to the lower potential end of a grid resistor 36, the upper end of which is connected to the grid element 38 of the final audio frequency amplifier tube 40. An audio frequency wave obtained after detection in the remainder of the receiver (not shown) is applied to grid 38 of tube 40. The output of audio frequency amplifier stage 30 is taken from the anode electrode 42 of tube 40 and applied by way of an audio frequency output transformer 44 to the voice coil 46 of a dynamic loudspeaker 48. In the condition just described, there will be not output from audio amplifier tube 40 since there is no anode or screen potential applied and a high negative bias is placed on grid 38. Upon switching from transmit to receive, arm 27 of switch 26 is thrown to the back contact 29 which immediately disables radio frequency amplifier stage 10 and energizes audio amplifier stage 30. A. F. signal input applied to grid 38 of amplifier tube 40 is prevented from being amplified for a short period of time due to the bias potential developed across resistor 20 which potential blocks tube 40. The time constant of filter 31 provides for an extended or prolongation of the time of application of bias potential on the order of $\frac{1}{10}$ of a second, which period affords sufficient muting to prevent annoying speaker disturbane but is sufficiently short to provide rapid enough recovery to prevent loss of the initial part of the intelligence to be received.

It should be understood that the circuit arrangement according to the invention is by no means limited to that hereinbefore described, but can be applied in a number of ways, either in the design of new equipment or by addition to existing equipment. For example, existing equipment having conventional switching means, which produce annoying speaker disturbances, may be modified according to the invention in an exceedingly simple manner. The lower (potential) end of the grid resistor, which is usually connected directly to ground, is connected through a capacitor to ground and through a resistor to a source of negative potential in one of the transmitter stages. The resistor-capacitor combination should have a time constant of the order of $\frac{1}{20}$ to $\frac{1}{5}$ of a second, so that the resistor values between 500,000 and 1,300,000 ohms and capacitor values between 0.1 and 0.15 microfarad will be satisfactory. Thirty to 50 volts negative bias, depending upon the audio amplifier tube to be blocked, are required, but practically every transmitter has one or more sources of potential of this magnitude. The drain will be very slight, so that the transmitted stages will not seriously be affected. In similar manner, cut-off potential may be supplied to a screen grid of the audio amplifier tube if desired, instead of to the control grid.

In a 152–174 mc./s. FM mobile communications receiver actually constructed, 50 volts bias was obtained from the third carrier frequency tripler stage of the transmitter part of the apparatus and applied to the final pentode audio amplifier of the receiver part of the apparatus, with the following values being given to the components shown in the drawing:

*Tubes*

| Reference Number | RMA Type |
|---|---|
| 16 | 6BH6. |
| 40 | 6AK6. |

*Resistors*

| Reference Number | Value | Unit |
|---|---|---|
| 20 | 39,000 | ohms. |
| 32 | 470,000 | ohms. |
| 36 | 560,000 | ohms. |
| 52 | 560 | ohms. |

*Capacitors*

| Reference Number | Value | Unit |
|---|---|---|
| 19 | 1,500.00 | Mmfd. |
| 34 | 0.15 | Mfd. |
| 54 | 20.00 | Mfd. |

The principles of the invention may also be applied to transceiver arrangements, i. e., circuit arrangements in which some of the components are actually switched from a circuit arrangement in which they are employed for transmitting to another circuit arrangement in which they are employed for receiving. Such switching is conventionally accomplished by means of a multiple two-position gang switch. It may be desired, however, that certain automatic switching features be introduced to control certain component circuitry in response to the transmitting circuit arrangement being energized. One such example of course would be the muting of the loudspeaker, which would be accomplished in essentially the same manner as hereinbefore described in detail. Another example is had in the squelching of the local oscillator circuit in a superheterodyne receiving circuit. Other component circuit changes may be effected equally as well in arrangements which will be obvious to those skilled in the art.

The invention claimed is:

1. In an installation of complementary radio apparatus including a transmitter and a receiver selectively energizable, a stage in said transmitter for translating signals to be transmitted including an electron discharge structure having a cathode and a grid, a stage in said receiver for translating signal currents including an electron discharge system having cathode and grid electrodes, a bias voltage producing element connected in circuit between the cathode and the grid of said electron discharge structure, an impedance element connected between the cathode of said electron discharge system and one end of said bias element, a resistor and a capacitor connected in series across said bias element, and a connection between the junction of said resistor and said capacitor and one of said electrodes of said electron discharge system, said resistor and capacitor having values at which a predetermined time period is effected whereby said electron discharge system is active only after said predetermined time period has elapsed after de-energizing said electron discharge structure.

2. In combined radio transmitting and receiving apparatus having a radio frequency amplifier for amplifying signals to be transmitted including an electron discharge structure having a cathode, a control grid and an anode, a bias voltage producing element connected in circuit between said control grid and said cathode to produce a potential thereacross when said structure is energized, and an audio frequency amplifier for amplifying received signals after detection including an electron discharge system having cathode and control grid electrodes to which signal currents are applied for amplification, said audio amplifier also having a screen grid electrode and an anode, an impedance element in the cathode and control grid circuit of said electron discharge system, a resistor connected in series between one of the electrodes of said electron discharge system and one end of said bias element, a capacitor connected between the end of said resistor remote from said bias element and the other end of said bias element, means in circuit with the anodes of both said amplifiers for changing the current passing conditions of said radio frequency and audio frequency amplifiers, in opposite senses, said resistor and capacitor having values at which a predetermined time prolongation period is effected whereby said electron discharge system will be active only after said predetermined time period has elapsed after deenergizing said electron discharge structure.

3. In combined radio transmitting and receiving apparatus having a radio frequency amplifier for amplifying signals to be transmitted including an electron discharge structure having a cathode, a control grid and an anode, a bias resistor connected in circuit between said control grid and said cathode to produce a potential thereacross when said structure is energized and an audio frequency amplifier for amplifying received signals after detection including an electron discharge system having cathode and control grid electrodes to which signal currents are applied for amplification, said audio frequency amplifier also having screen grid and anode electrodes, a filter resistor connected between one of the grid electrodes of said electron discharge system and the end of said bias resistor remote from the cathode of said electron discharge structure, and a filter capacitor connected between the end of said filter resistor remote from said bias resistor and the cathode of said electron discharge structure, said filter resistor and capacitor having values at which a predetermined time prolongation period is effected whereby said electron discharge system will be active only after said predetermined time period has elapsed upon de-energization of said radio frequency amplifier and energization of said audio frequency amplifier.

4. In combined radio transmitting and receiving apparatus having a radio frequency amplifier for amplifying signals to be transmitted including an electron discharge structure having a cathode, a control grid and an anode, a bias resistor connected in circuit between said control grid and said cathode to produce a potential thereacross when said structure is energized, and an audio frequency amplifier for amplifying received signals after detection including an electron discharge system having cathode and grid electrodes to which signal currents are applied for amplification, a grid resistor and a filter resistor connected in series between the grid electrode of said electron discharge system and the end of said bias resistor remote from the cathode of said electron discharge structure, and a filter capacitor connected between the junction of said grid and filter resistors and the cathode of said electron discharge structure, said filter resistor and capacitor having values at which a predetermined time prolongation period is effected whereby said electron discharge system will be active only after said predetermined time period has elapsed after deenergizing said electron discharge structure.

5. In a half duplex radio communication system including a transmitter and a receiver selectively energizable, a radio frequency amplifier stage in said transmitter for amplifying signals to be transmitted including an electron discharge structure having a cathode, a grid and an anode, an audio frequency amplifier stage in said receiver for amplifying signal currents after detection including an electron discharge system having cathode, grid and anode electrodes, a bias resistor connected in circuit between the cathode and grid of said electron discharge structure, a capacitor shunted across said resistor, means including a switching element to apply a source of energizing potential between the anode of said electron discharge structure and the anode electrode of said electron discharge system selectively and said point of fixed reference potential, a filter resistor and a filter capacitor connected in series across said bias resistor, and a connection between the junction of said filter resistor and capacitor and a grid electrode of said electron discharge system, said filter resistor and capacitor having values at which a predetermined time period is established whereby said electron discharge system is active only after said predetermined time period has elapsed after de-energizing said electron discharge structure by operating said switching element.

6. In a half duplex radio communication system including a transmitter and a receiver selectively energizable, a radio frequency amplifier stage in said transmitter for amplifying signals to be transmitted including an electron discharge structure having a cathode, a control grid and an anode, an audio frequency amplifier stage in said receiver for amplifying signal currents after detection including an electron discharge system having cathode, control and anode electrodes, a bias resistor connected in circuit between the cathode and the control grid of said electron discharge structure, the end of said bias resistor nearest the cathode of said electron discharge structure being connected to a point of fixed reference potential, a capacitor shunted across said resistor, means including a switching element to alternatively apply a source of energizing potential between said point of fixed reference potential and the anode of said radio frequency amplifier and the anode electrode of said audio frequency amplifier, a filter resistor and a filter capacitor connected in series between said point of fixed potential and the other end of a grid resistor connected between the junction of said filter resistor and said filter capacitor and the control electrode of said electron discharge system, said filter arrangement having values at which a predetermined time period is effected whereby said electron discharge system is active only after said predetermined time period has elapsed after said radio frequency amplifier is de-energized by operation of said switching element.

7. In combined radio transmitting and receiving apparatus having a radio frequency amplifier for amplifying signals to be transmitted including an electron discharge structure having a cathode, a control grid and an anode, a bias resistor connected in circuit between said control grid and said cathode to produce a potential thereacross when said structure is energized, and a capacitor shunted across said resistor, and an audio frequency amplifier for amplifying received signals after detection including an electron discharge system having cathode and grid electrodes to which signal currents are applied for amplification, a grid resistor and a filter resistor connected in series between the grid electrode of said electron discharge system and the end of said bias resistor remote from the cathode of said electron discharge structure, and a filter capacitor connected between the junction of said grid and filter resistors and the cathode of said electron discharge structure, said filter resistor and capacitor having values at which a time prolongation period of substantially one-tenth of a second is effected whereby said electron discharge system will be active only after substantially one-tenth of a second has elapsed after de-energizing said electron discharge structure.

8. In an installation of complementary electronic apparatus including a first wave translating channel including an electron discharge structure having at least a cathode electrode and a control electrode and a second wave translating channel including another electron discharge structure having at least a cathode electrode and a control electrode, a source of operating potential for other similar electrodes of said discharge structures, switching means for alternate application of said potential to similar electrodes of said structures to render only one of said wave translating channels operative at any given time, the operation of the second wave translating channel being adversely affected by energy emanating from said first wave translating channel for a period of time after said first wave translating channel is de-energized and the second wave translating channel is energized, means in series circuit with the cathode and control electrodes of the first said electron discharge structure to produce a direct potential in response to energization of said first wave translating channel, connections to apply said potential to corresponding electrodes of said other electron discharge structure to render the control electrode thereof sufficiently more negative with respect to the cathode electrode thereof than under normal conditions to block said other electron discharge structure, and means interposed in said connections to maintain said condition on said other electron discharge structure substantially for said time period.

9. A transmitter-receiver comprising a transmitter section including a radio frequency amplifier stage having a multi-electrode structure, a receiver section including an audio frequency amplifier stage having a multi-electrode structure, means in circuit with an electrode of said first stage for developing a bias voltage in response to the passage of current therein, a connection including an electric network between said means and a corresponding electrode of said audio stage to reduce the current flow in said audio stage for a given period of time, a source of operating potential for similar electrodes in said two multi-electrode structures, and a switch for alternatively connecting said source to the similar electrodes of said structures, said electric network having a time constant of value ranging from one-twentieth to one-fifth of a second.

NATHAN SAMUEL PARKS.

References Cited in the file of this patent

UNITED STATES PATENTS

| Number | Name | Date |
|---|---|---|
| 1,691,076 | Mathes | Nov. 13, 1928 |
| 1,747,835 | Mathes | Feb. 18, 1930 |
| 2,223,049 | Reichle | Nov. 26, 1940 |
| 2,277,731 | Toth | Mar. 31, 1942 |
| 2,293,528 | Barco et al. | Aug. 18, 1942 |
| 2,415,318 | Wheeler | Feb. 4, 1947 |
| 2,496,998 | Hershberger | Feb. 7, 1950 |